(No Model.)
J. C. MILLER.
CENTRAL DRAFT LAMP.
No. 403,768. Patented May 21 1889.
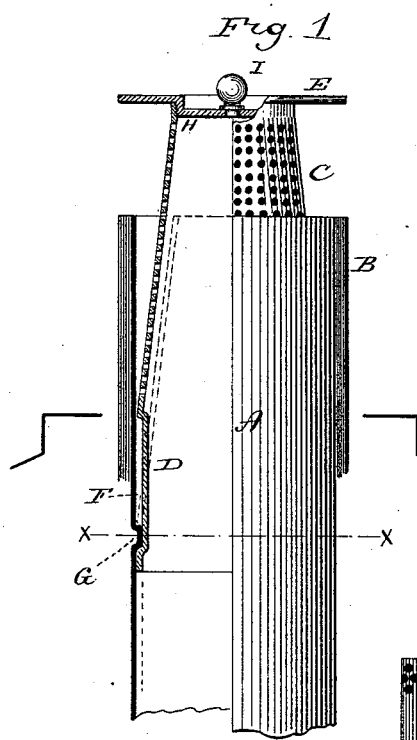
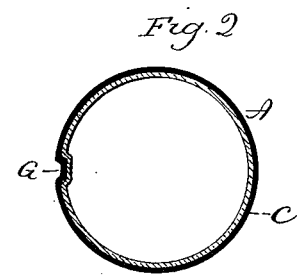
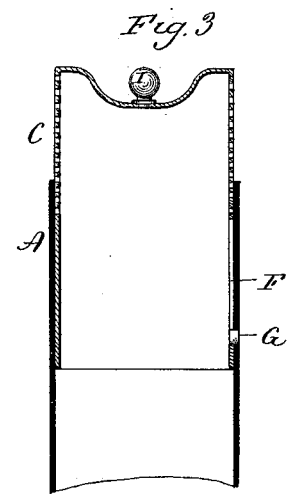
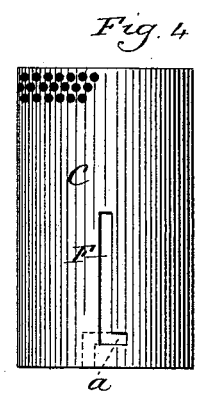
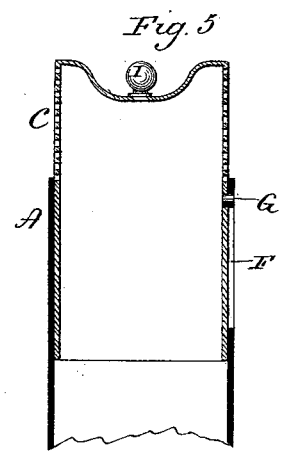
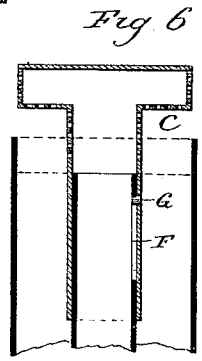

UNITED STATES PATENT OFFICE.

JOHN C. MILLER, OF MERIDEN, CONNECTICUT, ASSIGNOR TO THE MERIDEN BRONZE COMPANY, OF SAME PLACE.

CENTRAL-DRAFT LAMP.

SPECIFICATION forming part of Letters Patent No. 403,768, dated May 21, 1889.

Application filed December 17, 1888. Serial No. 293,820. (No model.)

*To all whom it may concern:*

Be it known that I, JOHN C. MILLER, of Meriden, in the county of New Haven and State of Connecticut, have invented a new Improvement in Central-Draft Lamps; and I do hereby declare the following, when taken in connection with accompanying drawings and the letters of reference marked thereon, to be a full, clear, and exact description of the same, and which said drawings constitute part of this specification, and represent, in—

Figure 1, a side view of the central tube and distributer in half vertical section; Fig. 2, a transverse section on line $x\ x$; Fig. 3, a vertical central section through the central tube, showing the cylindrical air-distributer; Fig. 4, a side view of the distributer detached, showing the form of the groove; Fig. 5, a vertical section through the central tube, illustrating a modification in the formation of the groove; Fig. 6, a modification.

This invention relates to an improvement in that class of central-draft lamps in which an air-distributer is arranged in the central tube at the top and above the wick, so that air passing up through the tube is discharged laterally into the flame from the base upward.

In order to trim the wick it is necessary that it should be done close upon the upper edge of the central tube, which the wick surrounds, the edge of the tube serving as a guide for such trimming; but such trimming flush with the end of the tube cannot be made with the air-distributer in place. Therefore the distributer is usually so constructed as to be removable, and so that when taken out of the tube it leaves the wick freely exposed for trimming. The distributers are usually made from very thin metal, and in removing and replacing the distributer it is liable to be bent out of shape, and once so bent it is inconvenient and often impracticable to restore it to its proper condition. Consequently the lamp does not burn as perfectly as it would do were the distributer in proper shape.

The object of my invention is to construct the distributer so that it may be disposed of to leave the wick free, but without removal from the tube.

To this end the invention consists in constructing the distributer below the upper end of the tube and the adjacent surface of the tube, the one with a projection and the other with a vertical groove, the said projection working in said groove, serving as a guide for vertical movement of the distributer, and so that the distributer may be pressed down into the tube at least flush with the upper end of the tube, and thus leave the wick properly exposed for trimming, and so that when trimmed the distributer may be raised to its place, thus avoiding the removal of the distributer from the tube and overcome the difficulties which result therefrom.

A represents the central tube of a lamp, such as commonly used in central-draft lamps, and around which the wick B is placed and made adjustable, the adjusting mechanism of the wick constituting no part of my present invention.

C represents the air-distributer, which is made tubular, closed at its upper end, and perforated upon its sides, its lower portion, D, of a diameter corresponding substantially to the internal diameter of the central tube, A; but so as to move freely up and down therein. The upper portion of the distributer may be of any of the usual forms. In Fig. 1 it is represented as tapering in diameter to its upper end, and the upper end is provided with a button, E, as a spreader for the flame, the button being, preferably, of larger diameter than the central tube, A. The lower portion, D, of the distributer is constructed with a vertical groove, F, which may be made in the form of a slot or by a depression therein, as seen in Figs. 1 and 2, and on the central tube, A, an inward projection, G, is formed, corresponding to the said groove F, and so that the distributer may slide up and down to the extent of the length of the groove, the ends of the groove forming stops to limit the extent of vertical movement of the distributer.

The parts are assembled by first forming the groove in the distributer, setting it within the central tube, and then making a depression in the central tube to form the projection in the groove, or the projection may be a stud introduced through the central tube, as seen in Fig. 3.

The stops for the rise and fall of the distributer are such that at its lowest limit it may come at least flush with the upper end of the tube A, as indicated in broken lines, Fig. 1. The other stop arrests the ascent when the proper elevation shall have been attained.

The distributer may fit the interior of the central tube, A, so as to produce sufficient frictional contact to support it in its two positions; but I prefer to make the movement of the tube free and make a right-angular recess from the groove, as seen at *a*, Fig. 4, and so that when the distributer is raised to its full height a partial rotation will engage the projection with the horizontal portion of the groove, and thereby support it in the up position. A return of the distributer will bring the projection into the vertical portion of the groove for the descent.

In case the button E in Fig. 1 is used, and of larger diameter than the diameter of the central tube, I make it detachable from the distributer by constructing the button with a central projection, H, and correspondingly screw-threading the upper end of the distributer and the said projection, so that the button may be screwed into the distributer to close the upper end and retain the button in place. If, however, the button is no larger than the interior diameter of the tube, then the detachment of the button is unnecessary. In the latter case, as a convenience for raising or lowering the distributer, I provide it with a suitable knob or handle, I, at its upper end, which may be grasped by the thumb and finger to raise or lower the distributer.

In the case of the cylindrical distributer such as seen in Figs. 3 and 4 the construction, so far as the engagement between the tube and the distributer is concerned, is the same as before described. In this case I preferably make a recess in the upper end of the distributer, and provide that recess with the handle I, by which the distributer may be raised or lowered, as before described.

In Figs. 3 and 4 I represent the groove as in the form of a slot cut through the distributer.

Instead of making the slot or groove in the distributer, with the stud in the tube, this order may be reversed, as represented in Fig. 5.

Under this construction there is no occasion for removing the distributer from the tube; but yet it may be made so as to be removed, if desirable, by making a continuation of the slot, as represented in broken lines, Fig. 4, this not interfering with the proper working of the distributer up and down, as I have described. When the distributer is in its down position, the wick is as free for trimming as if the distributer were removed, and the distributer, if of the cylindrical character seen in Fig. 3, forms a stopper to close the upper end of the tube to prevent the trimming-chips from falling into the tube, thus obviating another difficulty which exists in the trimming of this class of lamps.

In some cases, as seen in Fig. 6, the central draft-tube is made of less diameter than the wick-tube. Under this construction the distributer, as represented, is constructed with a projection from its under side corresponding to the central tube, and so as to work thereon, the slot and stud made the same as before described to support the distributer in the up position, as seen in Fig. 6, or permit its descent, as seen in broken lines, same figure. It will be understood that it is immaterial whether the distributer be outside or inside the draft-tube, both constructions being common and well known.

I claim—

1. In a central-draft lamp, the combination of the central draft-tube, and an air-distributer supported by said tube and movable vertically with relation thereto, the distributer and the said tube, the one constructed with a vertical groove and the other with a corresponding projection adapted to work in said groove, and whereby limited vertical movement is permitted said distributer, substantially as and for the purpose described.

2. The combination of the central draft-tube, A, and an air-distributer, C, supported by said tube and vertically movable with relation thereto, the said tube and distributer, the one constructed with a vertical groove and the other with a corresponding projection adapted to limit the extent of vertical movement of said distributer, the upper end of the said distributer recessed and provided with a handle, substantially as described.

3. The combination of the central tube, A, and an air-distributer, C, arranged therein for vertical movement, the said tube and distributer, the one constructed with a vertical groove and the other with a corresponding projection adapted to limit the extent of vertical movement of said distributer, the said distributer diminishing in diameter toward its upper end, with a button, E, detachably secured to the upper end of said distributer, substantially as described.

JOHN C. MILLER.

Witnesses:
E. A. MERRIMAN,
J. H. CHILD.